W. MILLSPAUGH.
Tool-Handle.

No. 208,256. Patented Sept. 24, 1878.

UNITED STATES PATENT OFFICE.

WILLIAM MILLSPAUGH, OF MIDDLETOWN, NEW YORK.

IMPROVEMENT IN TOOL-HANDLES.

Specification forming part of Letters Patent No. 208,256, dated September 24, 1878; application filed September 3, 1878.

*To all whom it may concern:*

Be it known that I, WILLIAM MILLSPAUGH, of Middletown, in the county of Orange and State of New York, have invented certain new and useful Improvements in Tool-Handles; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a tool-handle, as will be hereinafter more fully set forth.

Figure 1:
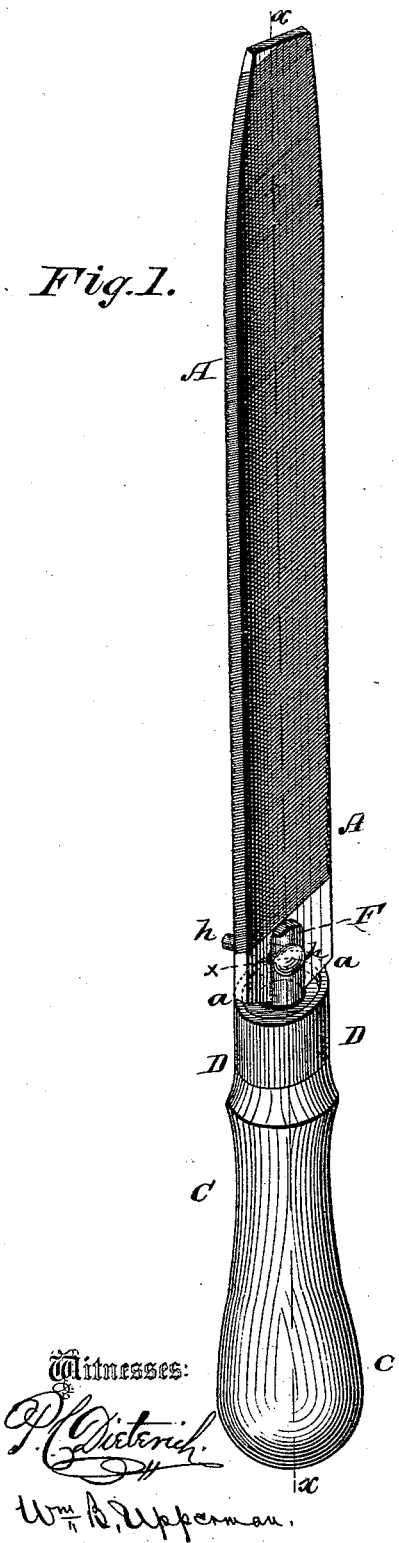
Figure 2:
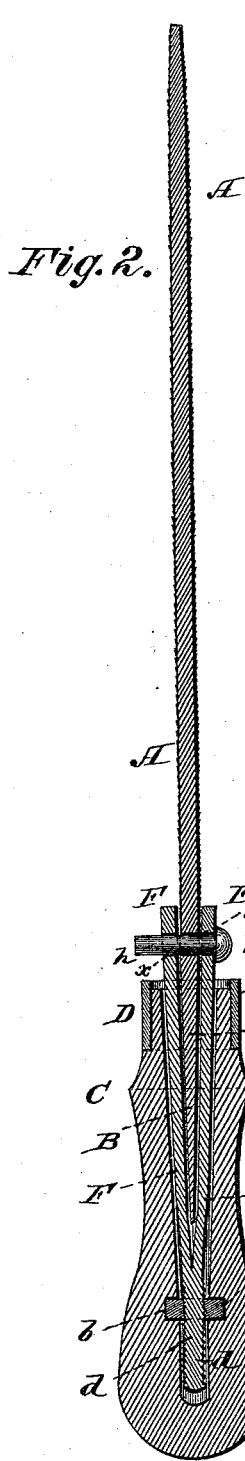
Figure 3:
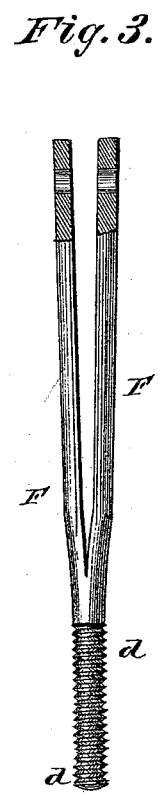

In the annexed drawing, to which reference is made, Figure 1 is a perspective view of my tool-handle; Fig. 2, a longitudinal section on the line $x\ x$, Fig. 1. Fig. 3 is a detailed view of the holder.

A represents a file or other tool, provided with a tang, B, and forming at the heel a shoulder, $a$, at each side of the tang. C represents the handle, made of wood or other suitable material, and provided at its end with a metal ferrule, D, which extends a short distance beyond the handle, as shown. From this end the handle is made hollow inward for a suitable distance, and a metal nut, $b$, is inserted in the handle at the bottom or inner end of the hollow or cavity.

F represents the holder, made preferably of malleable iron, and forming at its inner end a bolt or screw, $d$, and the body of the holder constitutes two prongs or arms, as shown.

The tang B of the tool is inserted between the arms of the holder, and a pin, $h$, is passed through the ends of said arms, and through a hole, $x$, in the heel of the tool, as shown. The holder being then inserted in the handle, the screw $d$ is screwed into the nut $b$ until the shoulders $a$ at the heel of the tool bear firmly against the end of the metal ferrule D, when the tool is held firmly and rigidly in the handle.

The tool A can easily and quickly be removed and another tool put in, if required, without removing the holder from the handle, by simply turning the handle so as to loosen the tool, and then taking out the pin $h$.

Having thus fully described my invention, what I claim as new, and desire to secure by Letters Patent, is—

In combination with a tool, A, provided with a hole, $x$, and a tang, B, forming shoulders $a\ a$, the handle C, with ferrule D and nut $b$, the pronged holder F, with screw $d$, and the pin $h$, all substantially as and for the purposes herein set forth.

In testimony that I claim the foregoing as my own I have hereto affixed my signature in presence of two witnesses.

WM. MILLSPAUGH.

Witnesses:
C. L. EVERT,
FRANK GALT.